United States Patent
Park et al.

(10) Patent No.: US 10,191,318 B2
(45) Date of Patent: Jan. 29, 2019

(54) TRANSPARENT DISPLAY DEVICE

(71) Applicant: LG Display Co., Ltd., Seoul (KR)

(72) Inventors: Sunyoung Park, Gyeonggi-do (KR); JiYoung Ahn, Gyeonggi-do (KR); Moonsun Lee, Sejong (KR); Jae-Hyun Kim, Seoul (KR); Pureum Kim, Incheon (KR); Kihan Kim, Gyeonggi-do (KR); Seokwon Ji, Incheon (KR)

(73) Assignee: LG Display Co., Ltd., Seoul (KR)

( * ) Notice: Subject to any disclaimer, the term of this patent is extended or adjusted under 35 U.S.C. 154(b) by 57 days.

(21) Appl. No.: 15/251,416

(22) Filed: Aug. 30, 2016

(65) Prior Publication Data

US 2017/0059916 A1    Mar. 2, 2017

(30) Foreign Application Priority Data

Aug. 31, 2015  (KR) .................. 10-2015-0123143

(51) Int. Cl.
*G02F 1/1333* (2006.01)
*G02F 1/137* (2006.01)

(52) U.S. Cl.
CPC .... *G02F 1/133377* (2013.01); *G02F 1/13725* (2013.01); *G02F 2201/44* (2013.01)

(58) Field of Classification Search
CPC ................................. G02F 1/133377
See application file for complete search history.

(56) References Cited

U.S. PATENT DOCUMENTS

| | | | |
|---|---|---|---|
| 2014/0085574 A1* | 3/2014 | Kashima | G02F 1/1334 349/86 |
| 2014/0185129 A1* | 7/2014 | Kim | H01L 51/5284 359/296 |
| 2015/0146131 A1* | 5/2015 | Satoh | G02F 1/1337 349/61 |
| 2016/0041430 A1* | 2/2016 | Lee | G02F 1/133617 349/96 |
| 2016/0202518 A1* | 7/2016 | Kwon | G02F 1/133377 349/43 |

* cited by examiner

*Primary Examiner* — Edmond Lau
(74) *Attorney, Agent, or Firm* — Morgan, Lewis & Bockius LLP

(57) ABSTRACT

Disclosed is a transparent display device in which a light shield rate is not lowered by partition walls in a light shield mode, and moreover, a light transmittance is not lowered in a transmissive mode. The transparent display device includes a transparent display panel including a plurality of transmissive areas transmitting incident light and a plurality of emissive areas emitting light, and a light control device disposed on a rear surface of the transparent display panel. The light control device is configured to be driven in a transmissive mode where the incident light is transmitted and a light shield mode where the incident light is blocked.

20 Claims, 7 Drawing Sheets

TRANSPARENT DISPLAY DEVICE

CROSS-REFERENCE TO RELATED APPLICATIONS

This application claims the benefit of the Korean Patent Application No. 10-2015-0123143 filed in Korea on Aug. 31, 2015, which is hereby incorporated by reference as if fully set forth herein.

BACKGROUND

Field of the Invention

The present invention relates to a transparent display device.

Discussion of the Related Art

Recently, as society advances to the information-oriented society, the display field of processing and displaying a massive amount of information is rapidly advancing, and correspondingly, various flat panel display (FPD) devices have been developed and are attracting much attention. Examples of the FPD devices include LCD devices, plasma display panel (PDP) devices, field emission display (FED) devices, electroluminescence display (ELD) devices, organic light emitting diode (OLED) display devices, etc.

Recently, display devices are becoming miniaturized, light, and lowered in consumption power, and thus, the application fields of the display devices are continuously increasing. Particularly, in most electronic devices or mobile devices, a display device is used as a type of user interface.

Moreover, transparent display devices which enable a user to look at a background or an object located behind the transparent display devices are being actively researched recently. The transparent display devices are good in space availability, interior, and design and may be applied to various fields. The transparent display devices realize an information recognition function, an information processing function, and an information display function by using a transparent electronic device, thereby solving the spatial limitation and visual limitation of electronic devices. For example, a transparent display device may be applied to windows of buildings or vehicles and thus may be implemented as a smart window which allows a background to be seen or displays an image.

A transparent display device may be implemented as an organic light emitting display device. In this case, power consumption is small, but a contrast ratio is not changed in a dark environment and is reduced in an environment having light. A contrast ratio based on the dark environment may be defined as a dark room contrast ratio, and a contrast ratio based on the environment having light may be defined as a bright room contrast ratio. That is, the transparent display device includes a transmissive area in order for a user to look at a background or an object located behind the transparent display device, and for this reason, the bright room contrast ratio is reduced. Therefore, in a case where the transparent display device is implemented as an organic light emitting display device, a light control device that realizes a light shield mode for blocking light and a transmissive mode for transmitting light is needed for preventing the bright room contrast ratio from being reduced.

The light control device may include a first base film, a second base film, a liquid crystal layer that is in a liquid state and is disposed between the first base film and the second base film, and a plurality of partition walls for maintaining a constant gap of the liquid crystal layer. The partition walls may be disposed on the first base film and may be adhered to the second base film by an adhesive material which is provided on each of the partition walls. Therefore, the wider the area of each of the partition walls, the higher the adhesive force between the first base film and the second base film. Accordingly, each of the partition walls may have a certain area or more for maintaining the adhesive force between the first base film and the second base film at a certain level or more.

If the partition walls are formed of a transparent material, the partition walls cannot block light. Therefore, if the partition walls are disposed in an area corresponding to the transmissive area of the transparent display device, light leakage occurs in the partition walls in the light shield mode, and for this reason, a light shield rate is lowered. The partition walls may be formed of a light-absorbing material for preventing light leakage from occurring in the partition walls in the light shield mode. However, if the partition walls are disposed in the area corresponding to the transmissive area of the transparent display device, light is blocked by the partition walls in the transmissive mode, and for this reason, a light transmittance is lowered.

SUMMARY

Accordingly, the present invention is directed to a transparent display device that substantially obviates one or more of the problems due to limitations and disadvantages of the related art.

An aspect of the present invention is directed to provide a transparent display device in which a light shield rate is not lowered by partition walls in a light shield mode, and moreover, a light transmittance is not lowered in a transmissive mode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a transparent display device including a transparent display panel including a plurality of transmissive areas transmitting incident light and a plurality of emissive areas emitting light and a light control device disposed on a rear surface of the transparent display panel, the light control device being driven in a transmissive mode where the incident light is transmitted and a light shield mode where the incident light is blocked. The light control device includes a first base film and a second base film facing each other, a plurality of liquid crystal cells provided between the first base film and the second base film, and a plurality of partition walls maintaining respective cell gaps of the plurality of liquid crystal cells. The plurality of partition walls are disposed at respective positions corresponding to the plurality of emissive areas.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF EXAMPLE EMBODIMENTS

Figure 1:
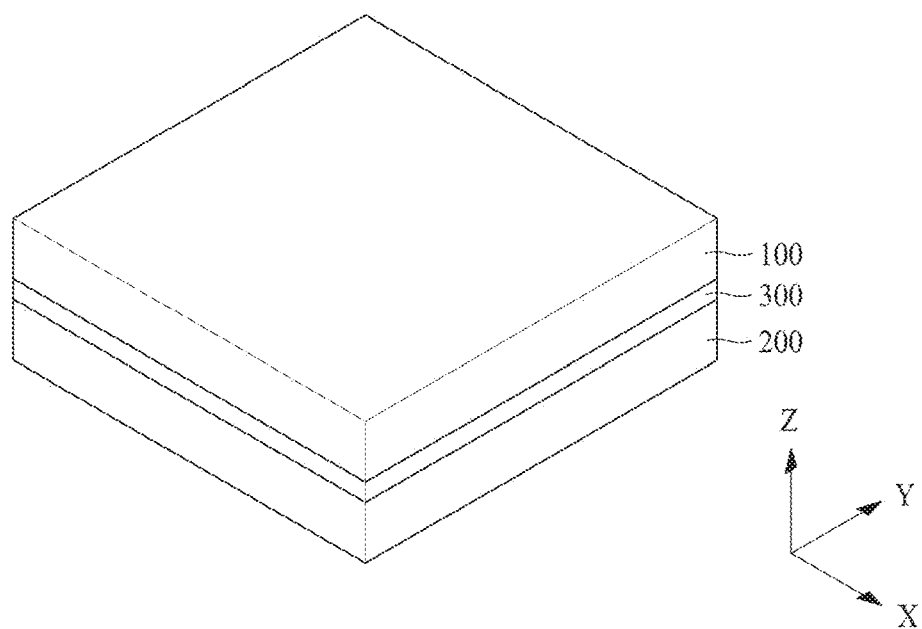
FIG. 1 is a perspective view illustrating a transparent display device according to an embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted.

In a case where 'comprise', 'have', and 'include' described in the present specification are used, another part may be added or included unless otherwise specified. The terms of a singular form may include plural forms unless referred to the contrary.

In construing an element, the element is construed as including an error range although there is no explicit description.

In describing a position relationship, for example, when a position relation between two parts is described as 'on', 'over', 'under', and 'next', one or more other parts may be disposed between the two parts unless otherwise specified.

In describing a time relationship, for example, when the temporal order is described as 'after', 'subsequent', 'next', and 'before', a case which is not continuous may be included unless otherwise specified.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

An X axis direction, a Y axis direction, and a Z axis direction should not be construed as only a geometric relationship where a relationship therebetween is vertical, and may denote having a broader directionality within a scope where elements of the present invention operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, exemplary embodiments of the present invention will be described in detail with reference to the accompanying drawings.

Figure 2:
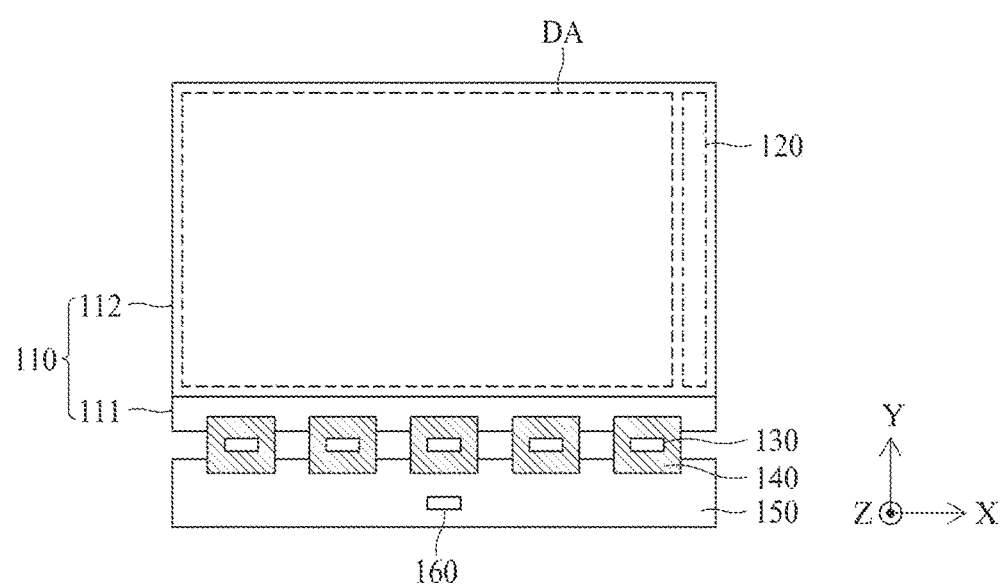
FIG. 2 is a plan view illustrating a transparent display panel, a gate driver, a source drive integrated circuit (IC), a flexible film, a circuit board, and a timing controller included in a transparent display device according to an embodiment of the present invention.
Figure 3:
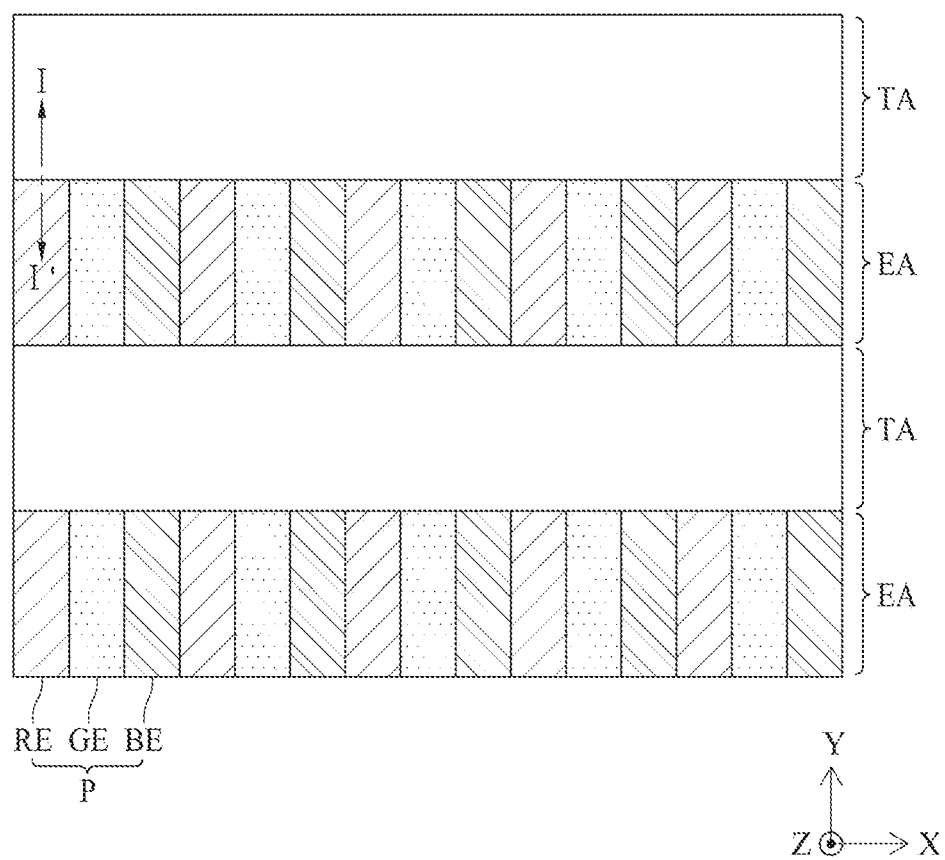
FIG. 3 is an exemplary diagram illustrating a transmissive area and an emissive area included in a display area of FIG. 2.
Figure 4:
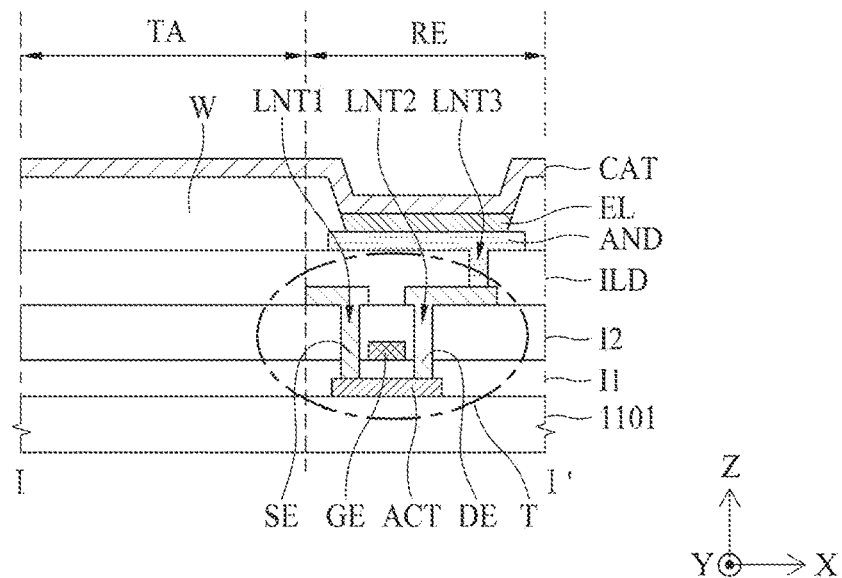
FIG. 4 is a cross-sectional view taken along line I-I' of FIG. 3.
Figure 5:
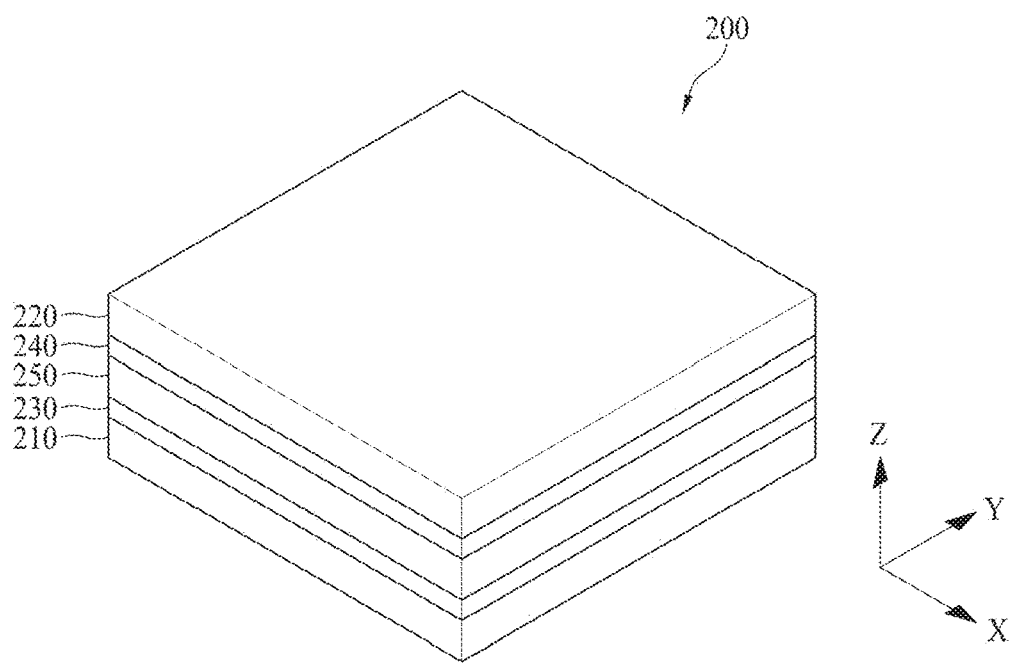
FIG. 5 is a perspective view illustrating in detail a light control device according to an embodiment of the present invention.

FIG. 1 is a perspective view illustrating a transparent display device according to an embodiment of the present invention. FIG. 2 is a plan view illustrating a transparent display panel, a gate driver, a source drive integrated circuit (IC), a flexible film, a circuit board, and a timing controller included in a transparent display device according to an embodiment of the present invention. FIG. 3 is an exemplary diagram illustrating a transmissive area and an emissive area included in a display area of FIG. 2. FIG. 4 is a cross-sectional view taken along line I-I' of FIG. 3. FIG. 5 is a perspective view illustrating in detail a light control device according to an embodiment of the present invention.

Hereinafter, the transparent display device according to an embodiment of the present invention will be described in detail with reference to FIGS. 1 to 5. In FIGS. 1 to 5, an X axis indicates a direction parallel to a gate line, a Y axis indicates a direction parallel to a data line, and a Z axis indicates a height direction of the transparent display device.

Referring to FIGS. 1 to 5, the transparent display device according to an embodiment of the present invention may include a transparent display panel 100, a gate driver 120, a source drive IC 130, a flexible film 140, a circuit board 150, a timing controller 160, a light control device 200, and an adhesive layer 300.

In the present embodiment, for example, the transparent display device may be implemented as an organic light emitting display device. However, the present embodiment is not limited thereto. In other embodiments, the transparent display device according to an embodiment of the present invention may be implemented as an LCD device, an electrophoresis display device, or the like.

The transparent display panel 100 may include a lower substrate 111 and an upper substrate 112. The upper substrate 112 may be an encapsulation substrate. The lower substrate 111 may be formed larger than the upper substrate 112, and thus, a portion of the lower substrate 111 may be exposed without being covered by the upper substrate 112.

A plurality of gate lines and a plurality of data lines may be provided in a display area DA of the transparent display panel 100, and a plurality of emission parts may be respectively provided in intersection areas of the gate lines and the data lines. The emission parts in the display area DA may display an image.

The display area DA may include a transmissive area TA and an emissive area EA as illustrated in FIG. 3. The transmissive area TA may be provided in plurality, and the emissive area EA may be provided in plurality. In the transparent display panel 100, the plurality of transmissive areas TA enable a user to look at an object or a background located behind the transparent display panel 100, and the plurality of emissive areas EA may display an image. In FIG. 3, the transmissive area TA and the emissive area EA are illustrated as being long provided in a gate-line direction (an X-axis direction), but is not limited thereto. That is, the transmissive area TA and the emissive area EA may be long provided in a data-line direction (a Y-axis direction).

The transmissive area TA may be an area that transmits incident light almost as-is. The emissive area EA may be an area that emits light. The emissive area EA may include a plurality of pixels P. Each of the pixels P is exemplarily illustrated as including a red emission part RE, a green emission part GE, and a blue emission part BE as in FIG. 3, but is not limited thereto. For example, each of the pixels P may further include a white emission part in addition to the red emission part RE, the green emission part GE, and the blue emission part BE. Alternatively, each of the pixels P may include two or more of a red emission part RE, a green emission part GE, a blue emission part BE, a yellow emission part, a magenta emission part, and a cyan emission part.

The red emission part RE may be an area that emits red light, the green emission part GE may be an area that emits green light, and the blue emission part BE may be an area that emits blue light. The red emission part RE, the green emission part GE, and the blue emission part BE disposed in the emissive area EA may each be a non-transmissive area that emits certain light and does not transmit incident light.

The red emission part RE, the green emission part GE, and the blue emission part BE may each include a transistor T, an anode electrode AND, an organic layer EL, and a cathode electrode CAT as illustrated in FIG. 4.

The transistor T may include an active layer ACT provided on the lower substrate 111, a first insulation layer I1 provided on the active layer ACT, a gate electrode GE provided on the first insulation layer I1, a second insulation layer I2 provided on the gate electrode GE, and a source electrode SE and a drain electrode DE that are provided on the second insulation layer I2 and are respectively connected to the active layer ACT through first and second contact holes CNT1 and CNT2. In FIG. 4, the transistor T is exemplarily illustrated as being formed in a top gate type, but is not limited thereto. In other embodiments, the transistor T may be formed in a bottom gate type.

The anode electrode AND may be connected to the drain electrode DE of the transistor T through a third contact hole CNT3 that passes through an interlayer dielectric ILD provided on the source electrode SE and the drain electrode DE. The anode electrode AND may be provided in plurality. A partition wall W may be provided between adjacent anode electrodes AND, and thus, the adjacent anode electrodes AND may be electrically insulated from each other.

The organic layer EL may be provided on the anode electrode AND. The organic layer EL may include a hole transporting layer, an organic light emitting layer, and an electron transporting layer. The cathode electrode CAT may be provided on the organic layer EL and the partition wall W. When a voltage is applied to the cathode electrode CAT and the anode electrode AND, a hole and an electron may respectively move to the organic light emitting layer through the hole transporting layer and the electron transporting layer and may be combined with each other in the organic light emitting layer to emit light.

In FIG. 4, the transparent display panel 100 is exemplarily illustrated as being implemented in a top emission type, but is not limited thereto. In other embodiments, the transparent display panel 100 may be implemented in a bottom emission type. The light control device 200 may be disposed in a direction opposite to a direction in which the transparent display panel 100 emits light. Therefore, in the top emission type, the light control device 200 may be disposed under the transparent display panel 100, namely, under the lower substrate 111, and in the bottom emission type, the light control device 200 may be disposed over the transparent display panel 100, namely, over the upper substrate 112.

In the top emission type, light emitted from the organic layer EL may be irradiated in a direction toward the upper substrate 112, and thus, the transistor T may be widely provided under the partition wall W and the anode electrode AND. Therefore, an area occupied by the transistor T may be wider in the top emission type than the bottom emission type. In the top emission type, the anode electrode AND may be formed of a metal material having high reflectivity like aluminum or a stacked structure including aluminum and indium tin oxide (ITO), and the cathode electrode CAT may be formed of a transparent metal material such as ITO, indium zinc oxide (IZO), or the like.

As described above, each of the pixels P of the transparent display device according to an embodiment of the present invention may include the transmissive area TA, which transmits incident light almost as-is, and the emissive area EA that emits light. As a result, in an embodiment of the present invention, a user may look at an object or a background located behind the transparent display device through the transmissive areas TA of the transparent display device.

The gate driver 120 may sequentially supply gate signals to the gate lines according to a gate control signal input from the timing controller 160. In FIG. 2, the gate driver 120 is exemplarily illustrated as being provided outside one side of the display area DA of the transparent display panel 100 in a gate driver-in panel (GIP) type, but is not limited thereto. In other embodiments, the gate driver 120 may be provided outside both sides of the display area DA of the transparent display panel 100 in the GIP type, may be manufactured as a driving chip and may be mounted on a flexible circuit, or may be attached on the transparent display panel 100 in a tape automated bonding (TAB) type.

The source drive IC 130 may receive digital video data and a source control signal from the timing controller 160. The source driver IC 130 may convert the digital video data into analog data voltages according to the source control signal and may respectively supply the analog data voltages to the data lines. If the source drive IC 130 is manufactured as a driving chip, the source drive IC 130 may be mounted on the flexible film 140 in a chip-on film (COF) type or a chip-on plastic (COP) type.

Since a size of the lower substrate 111 is larger than that of the upper substrate 112, a portion of the lower substrate 111 may be exposed without being covered by the upper substrate 112. A plurality of pads such as data pads may be provided in the portion of the lower substrate 111 which is exposed without being covered by the upper substrate 112. Lines connecting the pads to the source drive IC 130 and lines connecting the pads to lines of the circuit board 150 may be provided on the flexible film 140. The flexible film 140 may be attached on the pads by using an anisotropic conductive film, and thus, the pads may be connected to the lines of the flexible film 140.

The circuit board 150 may be attached on the flexible film 140 which is provided in plurality. A plurality of circuits implemented as driving chips may be mounted on the circuit board 150. For example, the timing controller 160 may be mounted on the circuit board 150. The circuit board 150 may be a printed circuit board (PCB) or a flexible printed circuit board (FPCB).

The timing controller 160 may receive the digital video data and a timing signal from an external system board (not shown). The timing controller 60 may generate a gate control signal for controlling an operation timing of the gate driver 120 and a source control signal for controlling the source drive IC 130 which is provided in plurality, based on the timing signal. The timing controller 60 may supply the gate control signal to the gate driver 120 and may supply the source control signal to the plurality of source drive ICs 130.

The light control device 200 may block incident light in a light shield mode, and in a transmissive mode, the light control device 200 may transmit all of the incident light. The light control device 200, as illustrated in FIG. 5, may include a first base film 210, a second base film 220, a first electrode 230, a second electrode 240, and a liquid crystal layer 250.

The first and second base films 210 and 220 may each be a plastic film. For example, the first and second base films 210 and 220 may each be a sheet or a film which includes cellulose resin such as triacetyl cellulose (TAC), diacetyl cellulose (DAC), or the like, cyclo olefin polymer (COP) such as norbornene derivatives or the like, acryl resin such as cyclo olefin copolymer (COC), poly(methylmethacrylate) (PMMA), or the like, polyolefin such as polycarbonate (PC), polyethylene (PE), polypropylene (PP), or the like, polyester such as polyvinyl alcohol (PVA), poly ether sulfone (PES), polyetheretherketone (PEEK), polyetherimide (PEI), polyethylenenaphthalate (PEN), polyethyleneterephthalate (PET), or the like, polyimide (PI), polysulfone (PSF), fluoride resin, and/or the like, but is not limited thereto.

The first electrode 230 may be provided on one surface of the first base film 210, and the second electrode 240 may be provided on one surface of the second base film 220 facing the first base film 210. The first and second electrodes 230 and 240 may each be a transparent electrode.

Each of the first and second electrodes 230 and 240 may be formed of silver oxide (for example, AgO, $Ag_2O$, or $Ag_2O_3$), aluminum oxide (for example, $Al_2O_3$), tungsten oxide (for example, $WO_2$, $WO_3$, or $W_2O_3$), magnesium oxide (for example, MgO), molybdenum oxide (for example, $MoO_3$), zinc oxide (for example, ZnO), tin oxide (for example, $SnO_2$), indium oxide (for example, $In_2O_3$), chromium oxide (for example, $CrO_3$ or $Cr_2O_3$), antimony oxide (for example, $Sb_2O_3$ or $Sb_2O_5$), titanium oxide (for example, $TiO_2$), nickel oxide (for example, NiO), copper oxide (for example, CuO or $Cu_2O$), vanadium oxide (for example, $V_2O_3$ or $V_2O_5$), cobalt oxide (for example, CoO), iron oxide (for example, $Fe_2O_3$ or $Fe_3O_4$), niobium oxide (for example, $Nb_2O_5$), ITO, IZO, aluminum doped zinc oxide (ZAO), aluminum tin oxide (TAO), or antimony tin oxide (ATO), but is not limited thereto.

The liquid crystal layer 250 may be driven in the transmissive mode, where incident light is transmitted, and the light shield mode where the incident light is blocked. In an embodiment of the present invention, it may be assumed that the light shield mode represents a case where a transmittance of the light control device 200 is lower than a %, and the transmissive mode represents a case where the transmittance of the light control device 200 is equal to or higher than b %. The transmittance of the light control device 200 may represent a ratio of light, which is incident on the light control device 200, to light output from the light control device 200. For example, a % may be within a range of 10% to 50%, and b % may be within a range of 60% to 90%. However, the present embodiment is not limited thereto.

Figure 6:
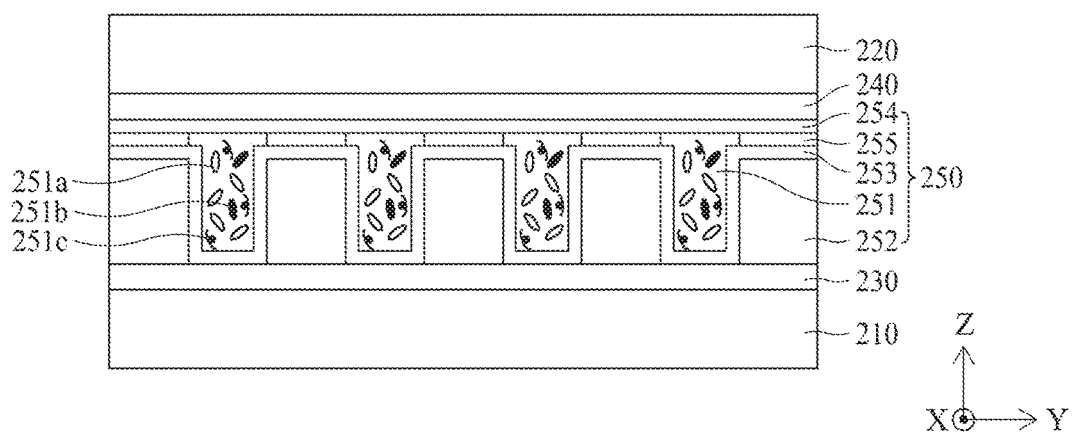
FIG. 6 is a cross-sectional view illustrating an example of one cross-sectional surface of FIG. 5.
Figure 7:
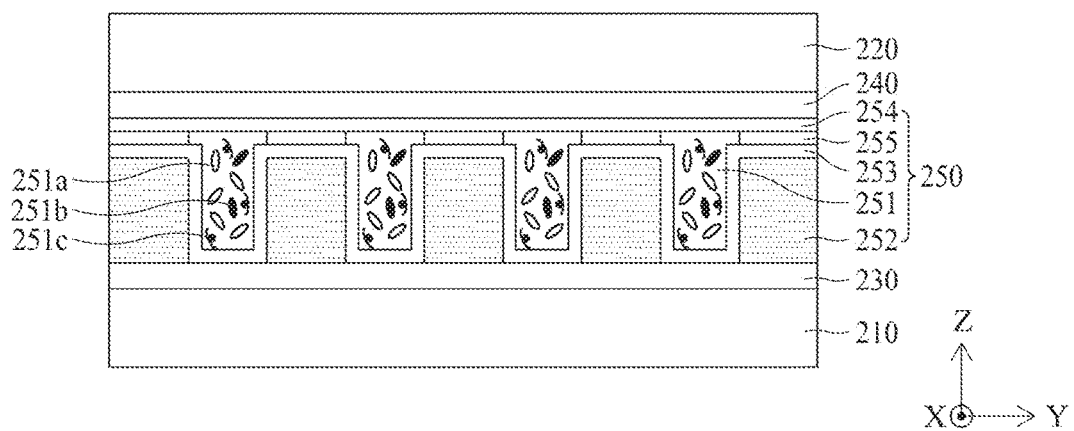
FIG. 7 is a cross-sectional view illustrating another example of one cross-sectional surface of FIG. 5.
Figure 8:
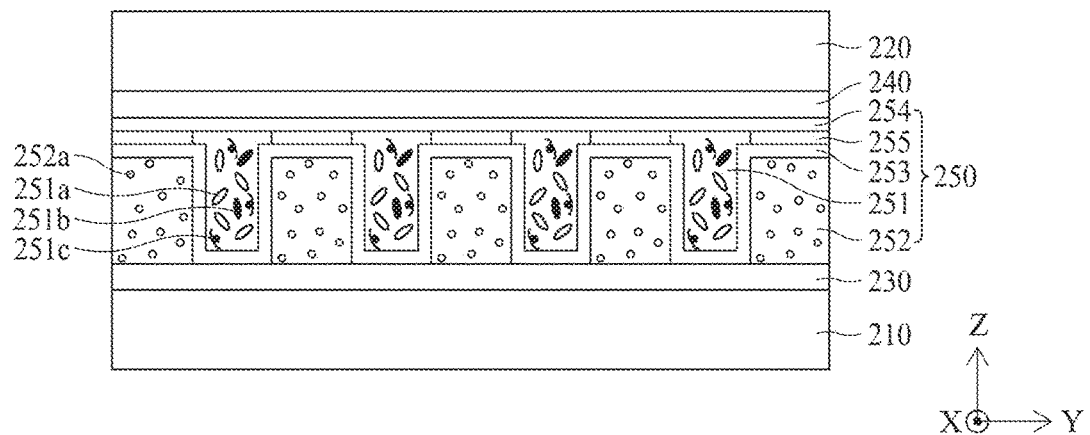
FIG. 8 is a cross-sectional view illustrating yet another example of one cross-sectional surface of FIG. 5.

The liquid crystal layer 250 may be a guest host liquid crystal layer which includes liquid crystal and dichroic dyes. In this case, the liquid crystal may be a host material, and the dichroic dyes may be guest materials. Alternatively, the liquid crystal layer 250 may be a polymer network liquid crystal layer which includes the liquid crystal, the dichroic dyes, and a polymer network. In this case, the liquid crystal layer 250 increases a scattering effect of incident light due to the polymer network. Alternatively, the liquid crystal layer 250 may be a dynamic scattering mode liquid crystal layer which includes the liquid crystal, the dichroic dyes, and ion materials. In a dynamic scattering mode, when an alternating current (AC) voltage is applied to the first and second electrodes 230 and 240, the ion materials may allow the liquid crystal and the dichroic dyes to move randomly. In FIGS. 6 to 8, for convenience of description, the liquid crystal layer 250 is exemplarily illustrated as being implemented as the dynamic scattering mode liquid crystal layer.

In detail, as illustrated in FIG. 6, the liquid crystal layer 250 may include a plurality of liquid crystal cells 251, a plurality of partition walls 252, a first alignment layer 253, a second alignment layer 254, and a plurality of adhesive layers 255.

The liquid crystal cells 251 may each include liquid crystal 251a, dichroic dyes 251b, and ion materials 251c. The liquid crystal 251a may be nematic liquid crystal whose alignment is changed by a vertical (a Z-axis direction) electric field between the first and second electrodes 230 and 240, but are not limited thereto. The liquid crystal 251a may be negative liquid crystal which is aligned in a vertical direction (the Z-axis direction) by the first and second alignment layers 253 and 254 when a voltage is not applied to the first and second electrodes 230 and 240.

An alignment of the dichroic dyes 251b may be changed by a vertical (a Y-axis direction) electric field like the liquid crystal 251a. Also, when the voltage is not applied to the first and second electrodes 230 and 240, like the liquid crystal 251a, the dichroic dyes 251b may be aligned in the vertical direction (the Z-axis direction) by the first and second alignment layers 253 and 254.

The dichroic dyes 251b may be dyes that absorb light. For example, the dichroic dyes 251b may be black dyes, which absorbs all of light having a visible light wavelength range, or dyes which absorb light outside a wavelength range of a specific color (for example, red) and reflect light having the wavelength range of the specific color (for example, red). In an embodiment of the present invention, the dichroic dyes 251b may use the black dyes for increasing a light shield rate at which light is blocked, but are not limited thereto. For example, the dichroic dyes 251b may be dyes having one of red, green, blue, and yellow or dyes having a color produced by a combination thereof. That is, according to an embodiment of the present invention, in the light shield mode, various colors instead of black-based colors may be expressed, and a background may be blocked. Therefore, according to an embodiment of the present invention, various colors may be provided in the light shield mode, and thus, a user feels a sense of beauty. For example, the transparent display apparatus according to an embodiment of the present invention may be used at public places, and if the transparent display apparatus is applied to a smart window or a public window requiring the transmissive mode and the light shield mode, the transparent display apparatus may block light while expressing various colors.

The ion materials 251c may allow the liquid crystal and the dichroic dyes to move randomly. The ion materials 251c may have a certain polarity, and in this case, the ion materials 251c may move to the first electrode 230 or the second electrode 240 according to a polarity of a voltage applied to the first and second electrodes 230 and 240. For example, in a case where the ion materials 251c have a negative polarity, when a voltage having a positive polarity is applied to the first electrode 230 and a voltage having a negative polarity is applied to the second electrode 240, the ion materials 251c may move to the first electrode 230. Also, in a case where the ion materials 251c have a negative polarity, when a voltage having a positive polarity is applied to the second electrode 240 and a voltage having a negative polarity is applied to the first electrode 230, the ion materials 251c may move to the second electrode 240. Also, in a case where the ion materials 251c have a positive polarity, when a voltage having a positive polarity is applied to the first electrode 230 and a voltage having a negative polarity is applied to the second electrode 240, the ion materials 251c may move to the second electrode 240. Also, in a case where the ion materials 251c have a positive polarity, when a voltage having a positive polarity is applied to the second electrode 240 and a voltage having a negative polarity is applied to the first electrode 230, the ion materials 251c may move to the first electrode 230.

Therefore, when an AC voltage having a certain period is applied to the first and second electrodes 230 and 240, the ion materials 251c may repeat an operation where the ion materials 251c move from the first electrode 230 to the second electrode 240 and then again move to the first electrode 230 at certain periods. In this case, the ion materials 251c may bump against the liquid crystal 251a and the dichroic dyes 251b while moving, and thus, the liquid crystal 251a and the dichroic dyes 251b may randomly move.

Alternatively, the ion materials 251c may exchange electrons according to a polarity of a voltage applied to the first and second electrodes 230 and 240. Therefore, when an AC voltage having a certain period is applied to the first and second electrodes 230 and 240, the ion materials 251c may exchange electrons at certain periods. In this case, the ion materials 251c may bump against the liquid crystal 251a and the dichroic dyes 251b while moving, and thus, the liquid crystal 251a and the dichroic dyes 251b may randomly move.

The light control device 200 according to an embodiment of the present invention may not apply a voltage to the first and second electrodes 230 and 240 in the transmissive mode, and in this case, the liquid crystal 251a and dichroic dyes 251b of each of the liquid crystal cells 251 may be aligned in the vertical direction (the Z-axis direction) by the first and second alignment layers 253 and 254. Therefore, the liquid crystal 251a and the dichroic dyes 251b may be aligned in a direction in which light is incident, and thus, the incidences of scattering and absorption of light by the liquid crystal 251a and the dichroic dyes 251b are minimized. Accordingly, most of light incident on the light control device 200 may pass through the liquid crystal cells 251.

Moreover, the light control device 200 according to an embodiment of the present invention may apply an AC voltage having a certain period to the first and second electrodes 230 and 240 in the light shield mode, and in this case, the liquid crystal 251a and the dichroic dyes 251b may randomly move according to movement of the ion materials 251c. Therefore, since the liquid crystal 251a and the dichroic dyes 251b move randomly, the light may be scattered by the liquid crystal 251a or may be absorbed by the dichroic dyes 251b. Accordingly, most of the light incident on the light control device 200 may be blocked by the liquid crystal cells 251.

Since the liquid crystal cells 251 are in a liquid state, the partition walls 252 for maintaining respective cell gaps of the liquid crystal cells 251 may be provided. The partition walls 252 may be spaced apart from each other by a certain interval. One liquid crystal cell 251 may be provided between adjacent partition walls 252. That is, adjacent liquid crystal cells 251 may be spaced apart from each other by a corresponding partition wall 252. Due to the partition walls 252, a ratio of the liquid crystal 251a and a ratio of the dichroic dyes 251b may be approximately similarly maintained in each of the liquid crystal cells 251. That is, in an embodiment of the present invention, a ratio of the liquid crystal 251a and a ratio of the dichroic dyes 251b may be equally maintained in the light control device 200. For example, a ratio of the liquid crystal 251a and a ratio of the dichroic dyes 251b may be less than 1% in difference in each of the liquid crystal cells 251. If a ratio of the liquid crystal 251a and a ratio of the dichroic dyes 251b may be more than 1% in difference in each of the liquid crystal cells 251, a difference occurs in a transmittance based on the transmissive mode and a light shield rate based on the light shield mode in each of the liquid crystal cells 251.

The partition walls 252 may each be formed of a transparent material as in FIG. 6. In this case, the partition walls 252 may each be formed of one of photoresist, an ultraviolet (UV) curable polymer, and polydimethylsiloxane, but is not limited thereto.

Figure 9:
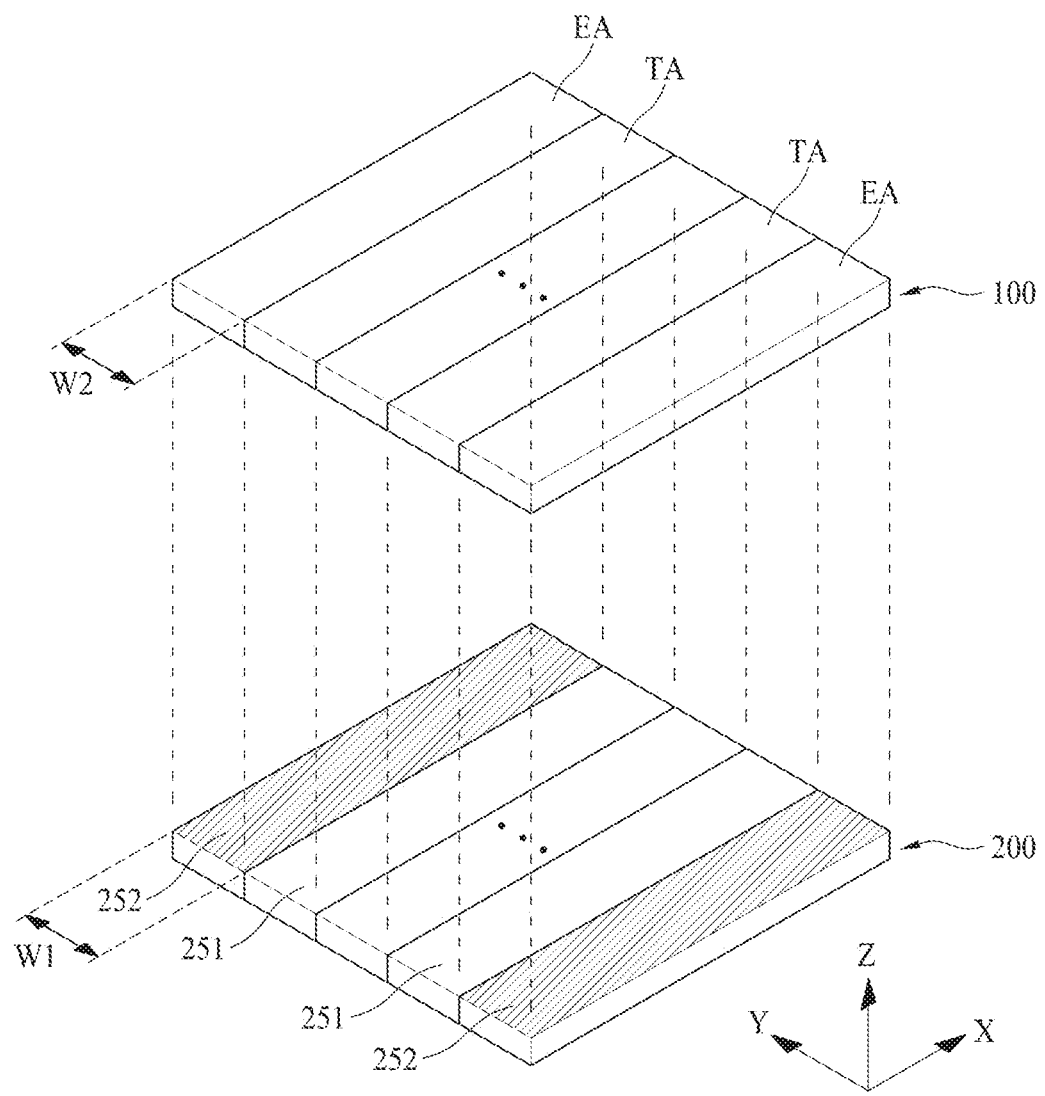
FIG. 9 is a diagram illustrating arrangement of partition walls of a light control device and an emissive area of a transparent display device according to an embodiment of the present invention.
Figure 10:
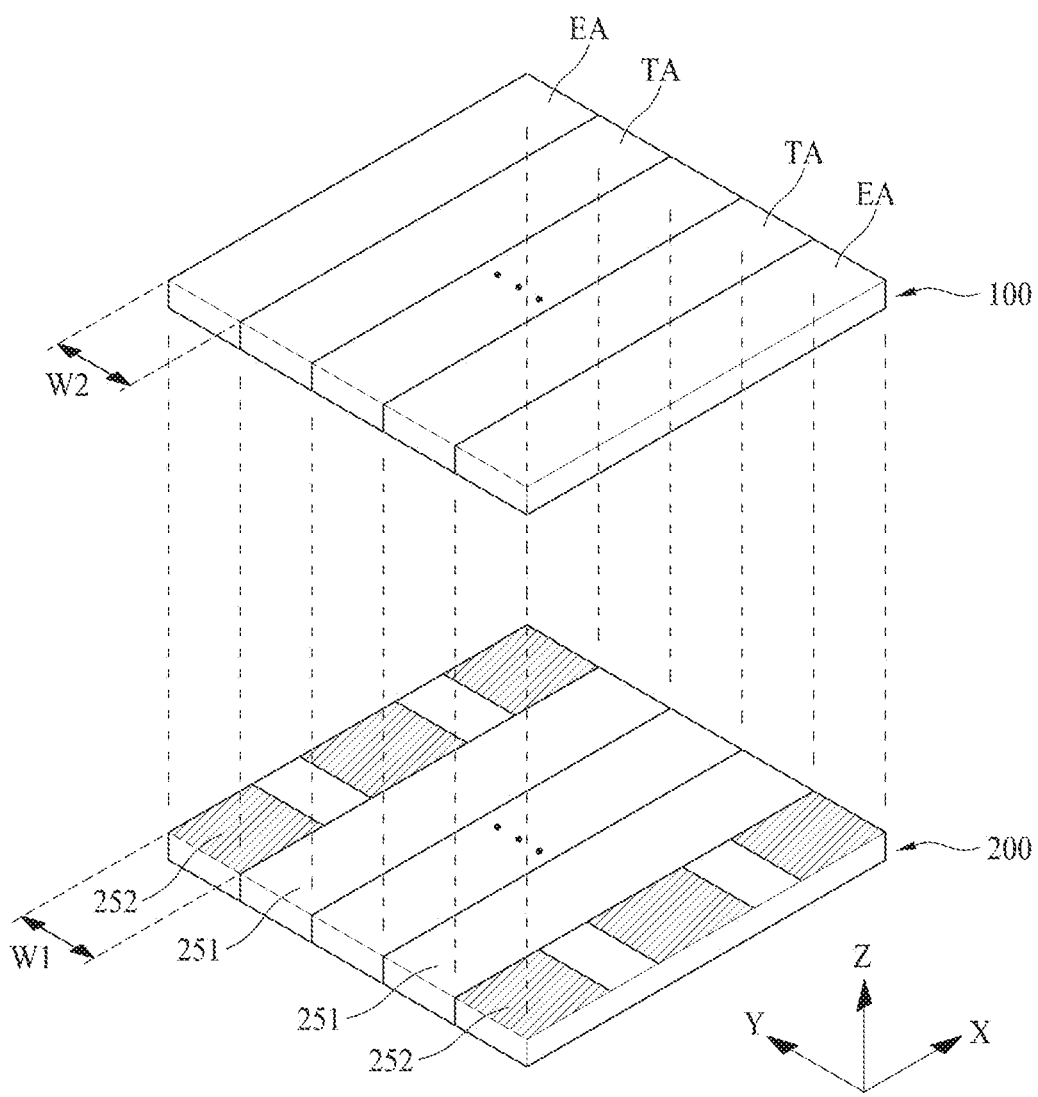
FIG. 10 is a diagram illustrating arrangement of partition walls of a light control device and an emissive area of a transparent display device according to another embodiment of the present invention.

Alternatively, as illustrated in FIG. 7, the partition walls 252 may include a material that absorbs light. For example, each of the partition walls 252 may be implemented as a black partition wall. In this case, since the partition walls 252 absorb light scattered by the liquid crystal 251a in the light shield mode, a light shield rate based on the light shield mode increases. Also, in an embodiment of the present invention, as illustrated in FIGS. 9 and 10, the partition walls 252 may be provided to correspond to the emissive area EA of the transparent display panel 100, and thus, even when each of the partition walls 252 is implemented as the black partition wall, a transmittance is hardly reduced in the transmissive mode.

As another alternative, as illustrated in FIG. 8, the partition walls 252 may each include a scatter particle 252a that scatters light. The scatter particle 252a may be bids or a silica ball. In this case, the partition walls 252 may again scatter light scattered by the liquid crystal 251a in the light shield mode, and thus, a light path may be long formed. When the light path becomes long, a probability that light is absorbed by the dichroic dyes 251b becomes high, and thus, a light shield rate based on the light shield mode increases.

The first alignment layer 253 may be provided on the first electrode 230 and the partition walls 252. The second alignment layer 254 may be provided on the second electrode 240. Each of the first and second alignment layers 253 and 254 may be a vertical alignment layer that allows the liquid crystal 251a and the dichroic dyes 251b to be aligned in the vertical direction (the Z-axis direction) when a voltage is not applied to the first and second electrodes 230 and 240.

The adhesive layers 255 may be provided on the first alignment 253 provided on the partition walls 252. Therefore, the first alignment layers 253 and 254 provided on the partition walls 252 may be adhered to each other by the adhesive layers 255. In FIGS. 6 to 8, the adhesive layers 255 are illustrated as being provided on only the first alignment layer 253 disposed on the partition walls 252, but may be provided on the liquid crystal cells 251 as well as the partition walls 252.

In this case, as an area of each of the partition walls 252 becomes wide, an adhesion area of the first alignment layer 253 and the second alignment layer 254 becomes wide, and thus, an adhesive force between the first alignment layer 253 and the second alignment layer 254 increases. If each of the first base film 210 and the second base film 220 is a plastic film, it is difficult to bond the first base film 210 and the second base film 220 by using a separate adhesive, and thus, the adhesion area of the first alignment layer 253 and the second alignment layer 254 may be widened for increasing the adhesive force between the first alignment layer 253 and the second alignment layer 254. However, since an area of each of the liquid crystal cells 251 is narrowed as the area of each of the partition walls 252 is widened, a light shield rate based on the light shield mode is lowered. Accordingly, the area of each of the partition walls 252 may be appropriately adjusted based on the adhesive force between the first alignment layer 253 and the second alignment layer 254 and the light shield rate based on the light shield mode.

The transparent display panel 100 may be adhered to the light control device 200 by the adhesive layer 300. The adhesive layer 300 may be a transparent adhesive film such as an optically clear adhesive (OCA) or a transparent adhesive such as an optically clear resin (OCR). In this case, the adhesive layer 300 may have a refractive index of 1.4 to 1.9 for refractive index matching between the transparent display panel 100 and the light control device 200.

If the light control device 200 is disposed in a direction in which light of the transparent display panel 100 is output, only the transmissive areas TA of the transparent display panel 100 should block the light without the emissive areas EA of the transparent display panel 100 blocking the light, and thus, a plurality of light shield areas may be formed by patterning the light control device 200 in order for only the transmissive areas TA of the transparent display panel 100 to block the light. That is, the light shield areas of the light control device 200 may be patterned to be aligned in the transmissive areas TA of the transparent display panel 100.

If the light control device 200 is attached to the transparent display panel 100 in a direction in which the transparent display panel 100 emits light, a plurality of light shield areas should be formed by patterning the light control device 200 and should be aligned to correspond to a plurality of transmissive areas TA of the transparent display panel 100, and thus, the light control device 200 may be attached to the transparent display panel 100 in a direction opposite to the direction in which the transparent display panel 100 emits the light. For example, if the transparent display panel 100 is the top emission type, the light control device 200 may be disposed under the transparent display panel 100, namely, under the lower substrate 111. If the transparent display panel 100 is the bottom emission type, the light control device 200 may be disposed over the transparent display panel 100, namely, over the upper substrate 112.

FIG. 9 is a diagram illustrating arrangement of partition walls of a light control device and an emissive area of a transparent display device according to an embodiment of the present invention. In FIG. 9, for convenience of description, only the transmissive areas TA and the emissive areas EA of the transparent display panel 100 and the liquid crystal cells 251 and the partition walls 252 of the light control device 200 are illustrated.

As shown in FIG. 9, when the partition walls 252 are each formed of a transparent material, the partition walls 252 cannot block light. For this reason, when the partition walls 252 are formed in areas corresponding to the transmissive areas TA of the transparent display device 100, light leakage occurs in the partition walls 252 in the light shield mode, causing a reduction in a light shield rate. Therefore, in an embodiment of the present invention, the partition walls 252 may be formed in areas corresponding to the emissive areas EA of the transparent display device 100. That is, the partition walls 252 may be formed and aligned in the emissive areas EA of the transparent display device 100.

Moreover, a width of each of the partition walls 252 in a short-side direction may be equal to or less than that of each of the emissive areas EA in a short-side direction. For example, as illustrated in FIG. 9, a width W1 of each of the partition walls 252 in a data-line direction (a Y-axis direction) or a gate-line direction (an X-axis direction) may be equal to or less than a width W2 of each of the emissive areas EA in the data-line direction (the Y-axis direction) or the gate-line direction (the X-axis direction). If the width W1 of each of the partition walls 252 in the data-line direction (the Y-axis direction) or the gate-line direction (the X-axis direction) may be equal to or less than the width W2 of each of the emissive areas EA in the data-line direction (the Y-axis direction) or the gate-line direction (the X-axis direction), the partition walls 252 may be formed in the transmissive areas TA of the transparent display panel 100, and for this reason, a light shield rate is lowered due to light leakage occurring in the partition walls 252 in the light shield mode.

In FIG. 9, it is illustrated that the partition walls 252 are successively arranged in parallel with the emissive areas EA, but the present embodiment is not limited thereto. In other embodiments, as illustrated in FIG. 10, the partition walls 252 may be non-successively arranged in parallel with the emissive areas EA. However, as an area of each of the partition walls 252 becomes wide, an adhesion area of the first alignment layer 253 and the second alignment layer 254 is widened, and thus, as illustrated in FIG. 9, the partition walls 252 may be successively arranged in parallel with the emissive areas EA.

In FIGS. 9 and 10, a plane of each of the partition walls 252 is exemplarily illustrated as being formed in a tetragonal shape, but is not limited thereto. In other embodiments, the plane of each of the partition walls 252 may have various shapes such as a circular shape, a triangular shape, an elliptical shape, a pentagonal shape, etc., in addition to a tetragonal shape. Also, in FIGS. 6 to 8, a cross-sectional surface of each of the partition walls 252 is exemplarily illustrated as being formed in a tetragonal shape, but is not limited thereto. In other embodiments, the cross-sectional surface of each of the partition walls 252 may have a taper shape, where a width of each of the partition walls 252 is thinned progressively closer to an upper side, or a reverse taper shape where the width of each of the partition walls 252 is thinned progressively closer to a lower side.

As described above, in an embodiment of the present invention, the partition walls 252 of the light control device 200 may be formed in areas corresponding to the emissive areas EA of the transparent display panel 100. As a result, in an embodiment of the present invention, a light shield rate is prevented from being lowered due to light leakage occurring in the partition walls 252 of the light control device 200 in the light shield mode. Also, in an embodiment of the present invention, the partition walls 252 may not be formed of a light-absorbing material for preventing light leakage from occurring in the partition walls 252 of the light control device 200 in the light shield mode. Accordingly, in an embodiment of the present invention, a problem where a transmittance is lowered because light is blocked by the partition walls 252 including a light-absorbing material in the transmissive mode is solved.

Moreover, in an embodiment of the present invention, the partition walls may include a light-absorbing material, and in this case, the partition walls may absorb light scattered by the liquid crystal of the liquid crystal cells in the light shield mode. Accordingly, in an embodiment of the present invention, a light shield rate based on the light shield mode increases.

Moreover, in an embodiment of the present invention, the partition walls may each include scatter particles that scatter light, and in this case, the partition walls may again scatter light scattered by the liquid crystal of the liquid crystal cells in the light shield mode, whereby a light path may be long formed. When the light path becomes long, a probability that light is absorbed by the dichroic dyes of the liquid crystal cells becomes high. Accordingly, in an embodiment of the present invention, a light shield rate based on the light shield mode increases.

It will be apparent to those skilled in the art that various modifications and variations can be made in the transparent display device of the present invention without departing from the spirit or scope of the inventions. Thus, it is intended that the present invention cover the modifications and variations of this invention provided they come within the scope of the appended claims and their equivalents.

What is claimed is:

1. A transparent display device comprising:
a transparent display panel including a plurality of transmissive areas transmitting incident light and a plurality of emissive areas emitting light; and
a light control device on a rear surface of the transparent display panel, the light control device configured to be driven in a transmissive mode where the incident light is transmitted and a light shield mode where the incident light is blocked,
wherein
the light control device comprises:
a first base film and a second base film facing each other;
a plurality of liquid crystal cells provided between the first base film and the second base film; and
a plurality of partition walls maintaining respective cell gaps of the plurality of liquid crystal cells, and
the plurality of partition walls are at respective positions corresponding to the plurality of emissive areas and are absent at areas corresponding to the transmissive areas.

2. The transparent display device of claim 1, wherein a width of each of the plurality of partition walls in a short-side direction is equal to or less than a width of each of the plurality of emissive areas in a short-side direction.

3. The transparent display device of claim 1, wherein the plurality of partition walls are successively arranged in parallel with the plurality of emissive areas.

4. The transparent display device of claim 1, wherein the plurality of partition walls are non-successively arranged in parallel with the plurality of emissive areas.

5. The transparent display device of claim 1, wherein the plurality of partition walls each comprise a light-absorbing material for absorbing light or a plurality of scatter particles for scattering light.

6. The transparent display device of claim 1, wherein the light control device further comprises:
a first electrode provided on one surface of the first base film;
a second electrode provided on one surface of the second base film facing the first base film;
a first alignment layer provided on the first electrode and the plurality of partition walls;
a second alignment layer provided on the second electrode; and
a plurality of adhesive layers provided on the first alignment layer provided on the plurality of partition walls.

7. The transparent display device of claim 6, wherein the plurality of liquid crystal cells each comprise liquid crystal and dichroic dyes absorbing light.

8. The transparent display device of claim 7, wherein each of the plurality of liquid crystal cells further comprises ion materials moving the liquid crystal and the dichroic dyes when alternating current (AC) voltages are respectively applied to the first electrode and the second electrode.

9. The transparent display device of claim 6, wherein each of the plurality of liquid crystal cells further comprises a polymer network.

10. A display device comprising:
a display panel including a plurality of transmissive areas and a plurality of emissive areas; and
a light control device having a liquid crystal layer including a plurality of liquid crystal cells and a plurality of partition walls, and the light control device blocking incident light in a light shield mode and transmitting all of the incident light in a transmissive mode;
wherein the partition walls including a light-absorbing material are spaced apart from each other by a certain interval and adjacent liquid crystal cells are spaced apart from each other by the corresponding partition wall,
wherein the partition walls are aligned to areas corresponding to the emissive areas of the display device and the liquid crystal cells are aligned to areas corresponding to the transmissive areas of the display device, thereby preventing a light leakage at the partition walls of the light control device in the light shield mode and a transmittance reduction in the transmissive mode of the display device.

11. The display device of claim 10, wherein the partition walls are made of black colored material to absorb light scattered by the liquid crystal cells or includes scatter particles that scatter light in the light shield mode.

12. The display device of claim 10, wherein the light control device is on the display panel in a direction opposite to a direction in which the display panel emits light.

13. The display device of claim 10, the plurality of liquid crystal cells further comprising a liquid crystal and a dichroic dyes,
wherein the adjacent liquid crystal cells are spaced apart from each other by a corresponding partition wall and a ratio of the liquid crystal and a ratio of the dichroic dyes are equally maintained in each of the liquid crystal cells.

14. The display device of claim 10, wherein a difference of the ratio of the liquid crystal and the ratio of the dichroic dyes in each of the liquid crystal cells is less than 1%.

15. The display device of claim 10, wherein the partition walls are non-successively arranged in parallel with the emissive areas of the display panel.

16. An apparatus comprising:
a display panel having see-through characteristics achieved by an array of pixels, with each sub-pixel having a light emissive area and a light transmissive area; and
a light control layer, operatively connected with the display panel at a rear surface thereof, having two opposing films with a controllable medium therebetween to allow the apparatus to operate in a light passing mode or a light shielding mode,
the light control layer having non-transparent partition walls that partition the controllable medium into a plurality of cells, provide a cell gap between the two opposing films, and are aligned behind only the light emissive areas of the display panel.

17. The apparatus of claim 16, wherein the non-transparent partition walls contain light absorbing material or light scattering material.

18. The apparatus of claim 17, wherein each of the two opposing films includes an electrode layer and an alignment layer, the display panel includes organic light emissive elements, and the controllable medium contains liquid crystal molecules and dichroic dyes that change their orientation for corresponding cells in response to voltage applied to the electrode layers in the two opposing films for the corresponding cells.

19. The apparatus of claim 18, wherein the organic light emissive elements emit light with respect to at least three colors among red, green, blue, white, yellow, magenta, and cyan.

20. The apparatus of claim 19, wherein the display panel and light control layer are implemented in smart window or public signage applications.

* * * * *